Feb. 8, 1966          J. E. SMITH          3,233,651
FLUID METERING SYSTEM
Filed May 28, 1962          3 Sheets-Sheet 1
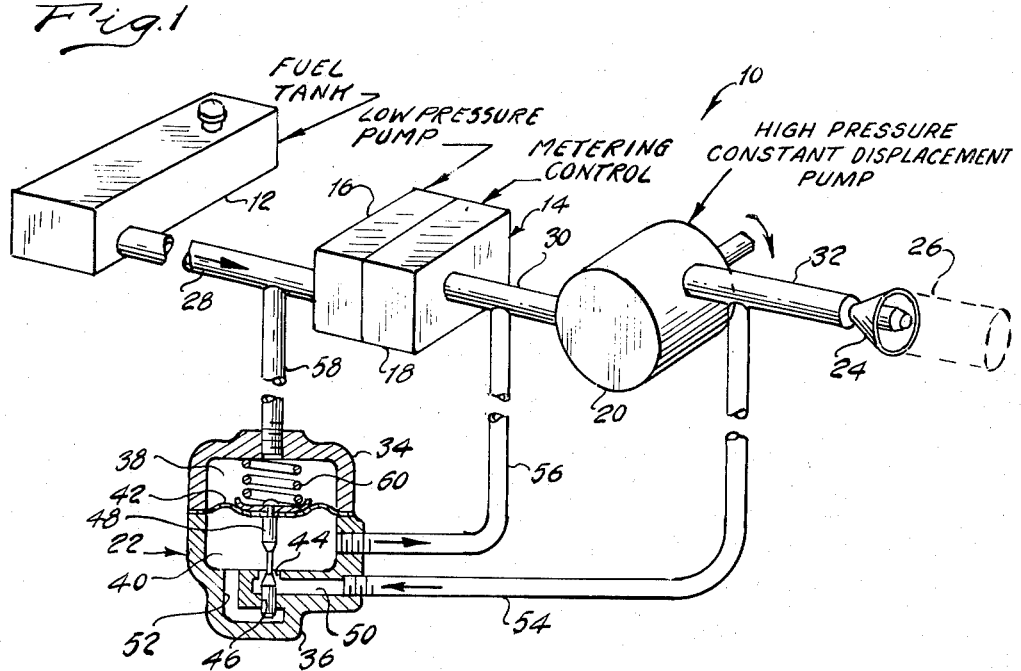
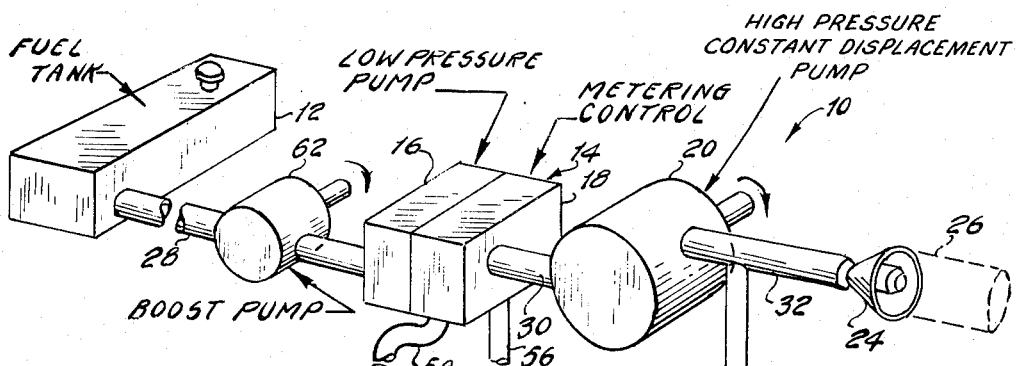
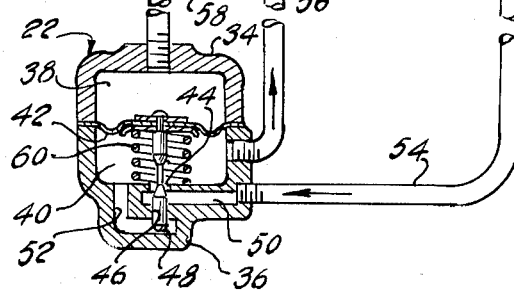
INVENTOR.
JOHN E. SMITH
BY
ATTORNEYS.

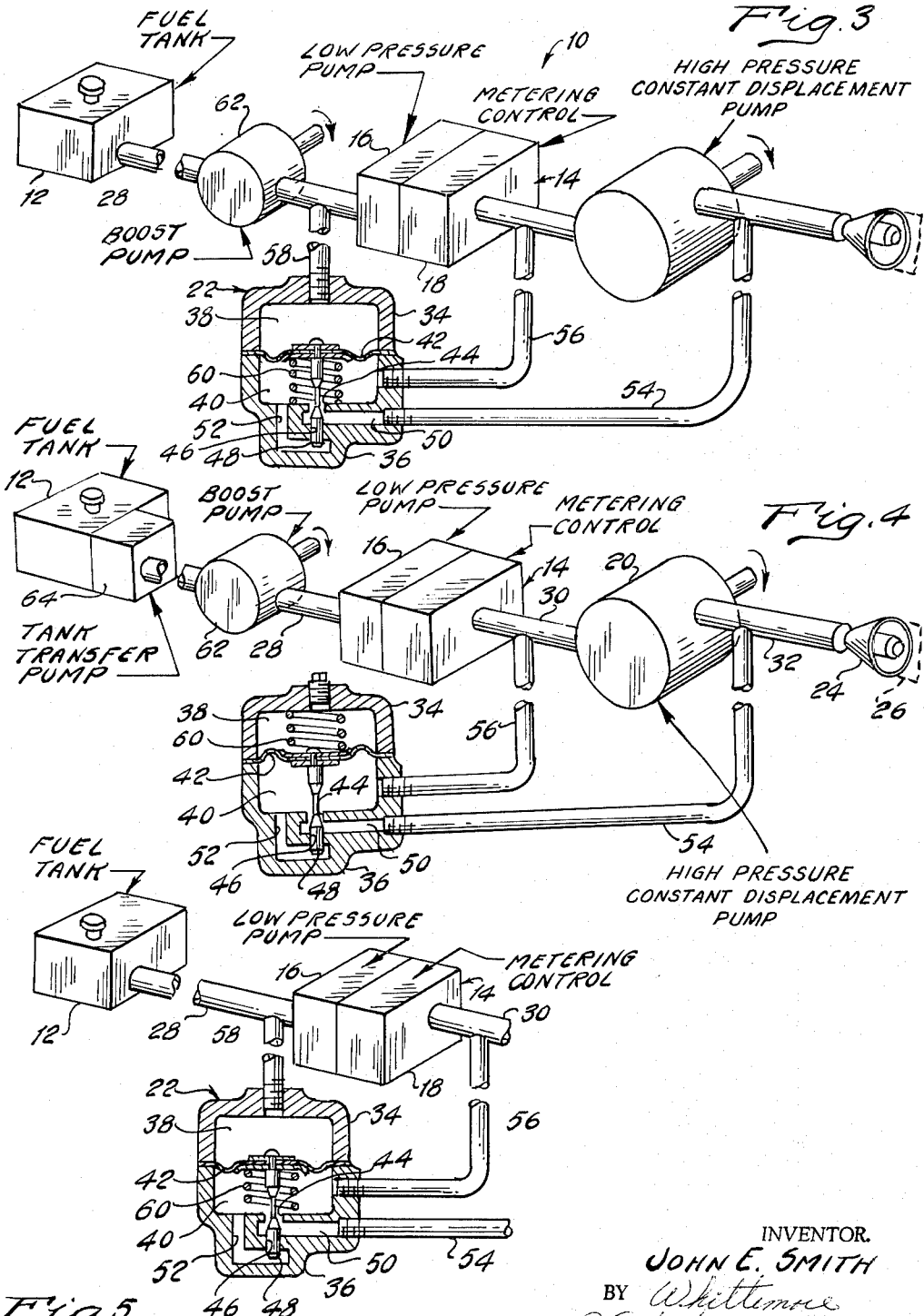

Feb. 8, 1966          J. E. SMITH          3,233,651

FLUID METERING SYSTEM

Filed May 28, 1962          3 Sheets-Sheet 3

INVENTOR.
JOHN E. SMITH
BY Whittemore
Hulbert & Belknap
ATTORNEYS.

United States Patent Office 3,233,651
Patented Feb. 8, 1966

3,233,651
FLUID METERING SYSTEM
John E. Smith, Rochester, Mich., assignor to Holley Carburetor Company, Warren, Mich., a corporation of Michigan
Filed May 28, 1962, Ser. No. 198,175
7 Claims. (Cl. 158—36.3)

The invention relates to a fluid metering system and refers more specifically to apparatus for metering fuel at low pressure to a high pressure positive displacement fuel pump without throttling the pump input and supplying only the metered fuel at high pressure from the output of the high pressure pump to a utilizing device.

In the past fuel metering systems for turbine engines and the like have generally utilized high pressure fuel metering and have been of the controlled pump, spill flow or high pressure flow meter types. Each of these metering systems has disadvantages. The high pressure flow meters are complicated and expensive while the variable displacement controlled pumps are often inaccurate at other than low speeds and minimum back pressure. The spill flow metering systems wherein a portion of the high pressure fuel is recirculated is generally subject to both the objections of high cost and inaccuracies in that some sort of variable displacement or otherwise controlled pump is usually included therein.

Prior low pressure fuel metering systems have usually been of the pump throttling or starving type wherein a positive displacement high pressure pump has been fed variable amounts of low pressure fuel. Such systems have the distinct disadvantage in that due to the variable volume of fuel fed the positive displacement pump bubbles are entrained in the fuel which on collapsing within the pump rapidly erode the pump surfaces.

It is therefore one of the objects of the invention to provide an improved fluid metering system including a positive displacement high pressure pump fed by a low pressure fluid metering control.

Another object is to provide a fuel metering system including a positive displacement high pressure pump, fed by a low pressure fuel metering control which system does not require throttling of the pump input.

Another object is to provide a fuel metering system including means for delivering fuel at a relatively low pressure to a low pressure fuel control operable to meter the fuel to a positive displacement high pressure pump in accordance with the requirements of a utilizing device and means for returning a variable portion of the fuel pumped by the high pressure pump from the pump output to the pump input in accordance with the requirements of the fuel utilizing device whereby the fuel delivered to the utilizing device is identical to that delivered to the high pressure pump by the low pressure fuel control and a volume of fuel flow through the high pressure pump which is constant for each pump speed is maintained.

Another object is to provide a fuel metering system as set forth above wherein the means for returning a portion of the pumped fuel around the high pressure pump comprises a conduit between the input and output of the high pressure pump including a restricting valve therein responsive to the variations in pressure at the pump inlet caused by the variable low pressure fuel delivery to the high pressure pump from the fuel metering control.

Another object is to provide a fuel metering system as set forth above wherein the restricting valve is responsive to the pressure difference between the fuel fed to the input of a low pressure pump feeding fuel to the low pressure fuel metering control and the output of the low pressure fuel metering control.

Another object is to provide a fuel metering system as set forth above wherein the restricting valve is responsive to the fuel pressure difference across an element of the low pressure fuel metering control.

Another object is to provide a fuel metering system as set forth above wherein a boost pump is provided between a fuel reservoir and a low pressure pump feeding fuel to the low pressure fuel metering control.

Another object is to provide a fuel metering system as set forth above wherein a tank transfer pump is provided between the fuel tank and the boost pump.

Another object is to provide a fuel metering system as set forth above wherein the restricting valve comprises a housing, a spring biased diaphragm in the housing carrying a valve member therewith, a first chamber formed by the housing and diaphragm and a second chamber formed by the diaphragm and housing which second chamber is in communication with a third chamber through an opening regulated by said valve member.

Another object is to provide a fuel metering system as set forth above wherein the biasing spring is in the first chamber and urges the valve toward the open position.

Another object is to provide a fuel metering system as set forth above wherein the valve spring is in the second chamber and urges the valve into a closed position.

Another object is to provide a fluid metering valve including a housing, a diaphragm supported by said housing defining with said housing a pair of chambers, means biasing the diaphragm toward one of said chambers, a low pressure conduit communicating with said one chamber, a third, fourth and fifth chamber defined by said housing, a low pressure conduit in communication with the first, third and fifth chambers, a valve member operatively connected to the diaphragm and extending between the second and third chambers in engagement with a valve pusher extending through the fourth chamber and between the third and fifth chambers operable to regulate a valve opening between the third and fourth chambers, means biasing said valve member toward the third chamber into a closing relation to said valve opening and a high pressure conduit for feeding high pressure fluid into the fourth chamber.

Another object is to provide a fuel metering system which is simple in construction, economical to manufacture and efficient in use.

Other objects and features of the invention will become apparent as the description proceeds, especially when taken in conjunction with the accompanying drawings, illustrating preferred embodiments of the invention, wherein:

FIGURE 1 is a diagrammatic representation of a fuel metering system constructed in accordance with the invention.

FIGURES 2–5 illustrate modifications of the fuel metering system shown in FIGURE 1.

Figure 7:
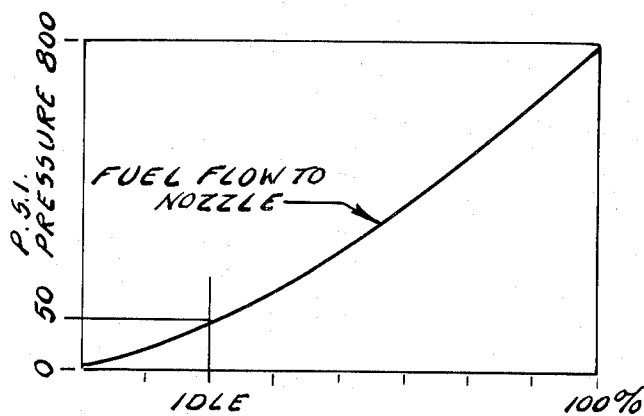
FIGURE 7 is a graph illustrating the pressure in the outlet conduit from the high pressure pump of a fuel metering system such as illustrated in FIGURE 1 plotted against nozzle fuel flow illustrating a characteristic nozzle fuel flow with the fuel metering system of FIGURE 1 attached to a predetermined engine.

With particular reference to the figures, one embodiment of the present invention will now be disclosed.

The fuel metering system 10 illustrated in FIGURE 1 includes a fuel tank 12 connected to a fuel control package 14 including a low pressure pump 16 and a low pressure fuel metering control 18. A high pressure pump 20 connected to the metering control 18 and a pressure sensitive valve 22 connected between the fluid tank 12 and pump 16, between the metering control 18 and high pressure pump 20 and between the high pressure pump 20 and a utilizing device, such as a nozzle 24 and burner 26, complete the fuel metering system 10.

In operation fuel is pumped to the metering control 18 from the fuel tank 12 by the low pressure pump 16 and is metered in accordance with the requirements of the burner 26 to the nozzle 24 through the high pressure pump 20. The high pressure pump 20 is a positive displacement pump operable to increase the pressure of the fuel fed thereto from the metering control 18. The pressure sensing valve 22 is operable in response to a change in pressure between the output of the metering control 18 and the input to the low pressure pump to vary the portion of the volume of fuel pumped by the high pressure pump 20 which is fed back to the input side of the high pressure pump 20 so that the mass rate of fuel flow delivered by the metering control 18 and that delivered to the nozzle 24 is identical. The pressure between the output of the metering control 18 and the input to the low pressure pump may vary while both the low pressure and high pressure pumps are at constant speed due to varying engine fuel requirements sensed by the metering control 18 which require variable quantities of fuel to be metered from the control 18. Obviously this pressure may also vary when the speed of the high pressure pump is varied.

More specifically the fuel tank 12 may be for example a fuel tank of an aircraft which may be maintained at substantially atmospheric pressure. The fuel tank as show in FIGURE 1 is connected to the fuel control package 14 by means of the fuel transfer conduit 28 extending between the fuel tank and fuel control package 14.

The fuel control package 14, as previously indicated, includes a low pressure pump 16 and the low pressure fuel metering control 18. As set forth above the fluid metering control 18 may be constructed simpler and more accurate than a high pressure fuel metering control for metering the same quantity of fuel due to the low pressure at which it operates. Since low pressure fuel metering controls in combination with low pressure pumps such as 16 are well known in the fuel metering arts in the interest of simplicity the details of construction thereof are not shown.

Similarly high pressure positive displacement pumps such as pump 20 are well known in the pumping art and are much simpler, more accurately controllable and more efficient in operation than presently known variable displacement high pressure pumps. The high pressure pump 20 will therefore not be disclosed in detail. As previously indicated the high pressure pump 20 is connected to the metering control 18 by means of the intermediate conduit 30.

The nozzle 24 and burner 26 may be for example a nozzle and burner for a jet engine. The nozzle 24 is connected to the high pressure pump 20 through the discharge conduit 32.

Pressure sensitive valve 22 comprises a housing including parts 34 and 36 constructed as shown best in FIGURE 1 to provide a chamber 38 and a chamber 40 in conjunction with the diaphragm 42 secured therebetween. The housing part 36 includes a guide passage 46 in which a valve member 48 secured to diaphragm 42 for movement therewith is reciprocal to control the opening of the valve orifice 44. The valve orifice 44 permits more or less communication between the chamber 40 and a separate chamber 50 provided in the housing part 36, as shown in FIGURE 1. Another chamber 52 is provided in the valve part 36 in communication with chamber 40 to receive the end of valve member 48 as shown in FIGURES 1–5 and assist in balancing the pressures acting on the valve member 48.

Thus the valve member 48 is responsive primarily to pressure change between the fuel in chamber 38 and that in chamber 40 to permit more or less fuel from chamber 50 to flow into chamber 40. Therefore since the chamber 50 is connected to the high pressure output side of the pump 20 through fuel return conduit 54 and since the chamber 40 is connected to the intermediate conduit 30 through the fuel return conduit 56 it will be seen that the quantity of fuel pumped by the high pressure pump 20 which is received at the nozzle 24 will vary with the position of the diaphragm 42 with a constant volume of fuel pumped by the high pressure pump 20. The position of the diaphragm 42 will depend on the relative pressures in the chambers 38 and 40 as determined by the pressure in the fuel transfer conduit 28 and the pressure in the intermediate conduit 30.

Thus in over-all operation with the fuel metering system shown in FIGURE 1 in equilibrium so that a predetermined volume of the fuel pumped by the high pressure pump 20 at each predetermined pump speed is being fed to the nozzle 24 and the rest of the fuel pumped by the high pressure pump 20 is being returned to the input side of the pump 20 through the valve 22, if the burner 26 requires more fuel which requirement is registered on the fuel metering control 18 in the usual manner, more fuel is metered through the fluid metering control 18 into conduit 30. The pressure of the fuel in conduit 30 is thereby increased so that diaphragm 42 is caused to move upward in FIGURE 1 in opposition to the bias applied to the diaphragm 42 by the bias spring 60. Upward movement of the diaphragm 42 causes a restriction of the orifice 44 by the valve member 48 so that the portion of constant volume of fuel pumped by the pump 20 which is returned to the input side of the pump is reduced and the required additional fuel is pumped to the nozzle 24.

If the fuel requirement of the burner is lowered the opposite action takes place whereby the pressure in chamber 40 is lowered and valve member 48 is opened so that more of the fuel pumped by the high pressure pump 20 is returned through orifice 44 to the input side of the high pressure pump 20 and less is available at the nozzle 24.

Thus it will be seen that a simple, economical and efficient fuel metering system has been provided in which a high pressure positive displacement pump is fed by a lower pressure fuel metering control. Further it will be readily recognized that the positive displacement pump 20 is not subject to the rapid deterioration which is present in high pressure pumps wherein the output is controlled by input throttling or starving and that the fuel fed to the pump 20 will be identical in quantity with the fuel metered by the fuel metering control 18 in accordance with the requirements of the burner 26.

In the several modifications of the fuel metering system shown in FIGURES 2 through 5 the same reference characters have been used to denote the same or similar elements. New reference characters have been used to designate additional elements in FIGURES 2 through 5 and in the modified valve illustrated in FIGURE 6.

The modification of the invention illustrated in FIGURE 2 includes a boost pump 62 placed in the transfer conduit 28 between the fuel tank 12 and low pressure pump 16. Also, in FIGURE 2 it will be noted that the conduit 58 and the return conduit 56 are indicated as being connected across an element of the fuel metering control which element provides the required pressure difference variable in accordance with the fuel requirements of the burner 26.

It will be readily recognized by those in the art that with most known low pressure fluid metering controls a number of pressures variable in accordance with the requirements of a utilizing device are present in the controls. Thus no specific connections are indicated in the modification of the invention illustrated in FIGURE 2.

Additionally it will be noted that the spring 60 of the fuel metering system illustrated in FIGURE 2 has been seated in chamber 40 rather than in chamber 38. Thus it will be evident that it makes no difference in the invention whether or not the pressure in the intermediate conduit 30 is higher or lower than the pressure in the conduit 58. The only difference that changing the relative values of the pressures in the conduits 56 and 58 makes is that the bias spring 60 must be changed between the chambers 38 and 40. The operation of the modification of the fuel metering system illustrated in FIGURE 2 is entirely analogous to the operation of the fuel metering system illustrated in FIGURE 1.

The modified fuel metering system illustrated in FIGURE 3 differs from that of FIGURE 1 only in the provision of the boost pump 62 and the placing of the spring 60 in the chamber 40 rather than in the chamber 38. Thus the conduits 58 and 56 are connected into the transfer conduit 28 and intermediate conduit 30 as shown in FIGURE 1. In this modification it is assumed that the pressure drop across the combined fuel control package 14, consisting of the low pressure pump 16 and the fuel metering control 18 is a little greater than the pressure rise created by pump 16. If spring 60 and diaphragm 42 were reversed as shown in FIGURE 4 the fuel metering system 10 would operate with the pressure rise created by pump 16 greater than the pressure drop across the control package 14.

The modification of the fuel system 10 illustrated in FIGURE 4 further includes a tank transfer pump 64 and a boost pump 62. It will further be noted that the chamber 38 in the modified fuel metering system illustrated in FIGURE 4 is vented to the atmosphere rather than connected to the transfer conduit 28.

The modification of the metering system 10 which is shown in FIGURE 5 is identical to the fuel metering system 10 except for the positioning of the spring 60 in the chamber 40 rather than in the chamber 38. As previously indicated the position of the spring 60 may be changed due to the pressure drop across the fuel metering control 14 being greater than the pressure increase across the low pressure pump 16.

The operation of the modification of the invention illustrated in FIGURE 5 and the operation of the modification of the invention shown in FIGURES 3 and 4 is entirely analogous to the operation of the invention illustrated in FIGURE 1.

In FIGURE 7 the pressure in discharge conduit 32 is shown plotted against fuel flow to an engine for a typical installation of the fuel metering system 10. Fuel flow in the installation represented in FIGURE 7 varies from a low of idle fuel flow to one hundred percent fuel flow as the pressure in discharge conduit 32 varies between 50 and 800 pounds per square inch. The fuel flow to nozzle curve illustrated in FIGURE 7 applies only if the nozzles are simplex, i.e., have a fixed metering area.

Figure 6:
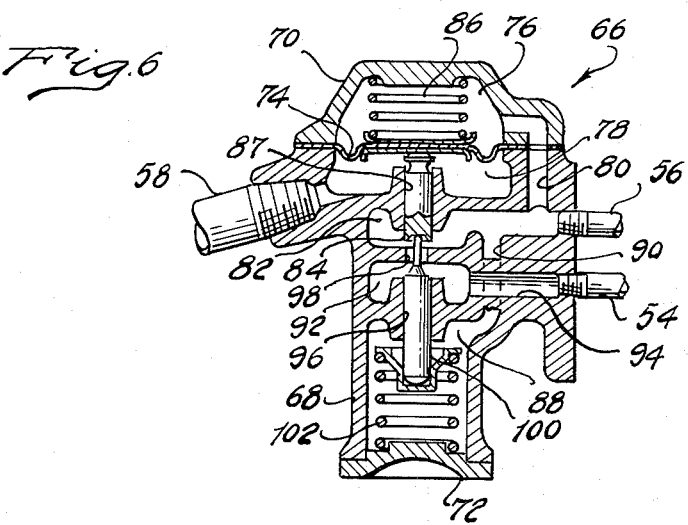
FIGURE 6 is a diagrammatic section view of a modification of the restricting valve of the fuel metering systems illustrated in FIGURES 1–5.

In FIGURE 6 there is shown a modification 66 of the pressure sensitive valve 22. The pressure sensitive valve 66 includes a main body portion 68, an upper cap 70 and a plug 72. The body 68 and upper cap 70 include a diaphragm 74 therebetween whereby separate chambers 76 and 78 are provided. The chamber 78 is connected directly to the conduit 58 as shown in FIGURE 1, while the chamber 76 is connected to the low pressure return conduit 56 through passage 80 and chamber 82. A valve 84 is slidably received in the passage 87 between the chambers 78 and 82 and is in engagement with the diaphragm 74 which is biased toward the valve 84 by means of the spring 86. The plug 72 and the body 68 form a chamber 88 therebetween which is also in comunication with the low pressure return conduit 56 through passage 90 and chamber 82. Body member 68 further includes the chamber 92 formed therein which is in communication with the high pressure fuel return conduit 54, as shown in FIGURE 1, through the passage 94. A passage 96 is provided between the chambers 88 and 92 while an orifice 98 is provided between the chambers 92 and 82. The connector or pusher 100 is slidably positioned in the passage 96 and is biased into engagement with the valve member 84 by means of the spring 102 as shown best in FIGURE 6. If desired the diameter of valve member 84 may be such as to permit the valve member 84 to slide through the orifice 98 in which case fuel metering would be edge to edge metering instead of the present edge to surface metering.

The operation of the pressure sensitive valve 66, as shown in FIGURE 6, is similar to that of the pressure sensitive valve 22 shown in FIGURES 1–5. Thus the amount of fluid returned to conduit 56 from conduit 54 is controlled by the position of the valve member 84. The position of the valve member 84 is under the direct control of the pressure difference in the chambers 76 and 78 as before. The springs 86 and 102 offer a differential bias for the valve member 84 which is equal to the difference in forces of springs 86 and 102 and is not compromised by the general level of force in the springs. The rate of the springs 86 and 102 is not particularly important as will be understood by those in the art. However, the load on the springs is different by the difference in pressure in the chambers 76 and 78 acting on the diaphragm 74.

The valve structure illustrated in FIGURE 6 has an added feature in that it may also function as a relief valve. That is to say that when pressure in chamber 92 exceed a predetermined value for a particular valve area and force of spring 86 the valve 84 is forced upwardly in opposition to the bias of spring 86 to allow fluid to exit from chamber 92 through orifice 98, chamber 82 and conduit 56. This additional function of the valve structure 66 in no way compromises the major function thereof which is to make a slave control of the pump which is to say to cause the fluid pumped to the nozzle 24 to be the same as that metered by the metering control 14.

While one embodiment of the present invention and some specific modifications thereof have been disclosed in detail it will be understood that other embodiments and modifications of the invention are contemplated. It is therefore the intention to include in the invention all such modifications and embodiments of the invention as are defined by the appended claims.

What I claim as my invention is:

1. A fuel metering system for metering fuel to a utilizing device having varying fuel requirements comprising a source of fuel, a high pressure positive displacement fuel pump operable at all times to pump a mass rate of fuel in excess of the total fuel requirements of the utilizing device having an output connected to the utilizing device, a fuel control package connected between the source of fuel and the high pressure pump including a low pressure pump and a low pressure fuel metering control for metering fuel to the high pressure pump from the source of fuel in accordance with the requirements of the utilizing device and pressure responsive means connected across the fuel control package for bypassing the quantity of fuel pumped by said high pressure pump in excess of the total fuel requirements of the utilizing device back to the input side of the high pressure pump so that the fuel fed to the utilizing device from the high pressure pump is identical to the fuel metered to the input of the high pressure pump from the low pressure fuel metering control.

2. Structure as set forth in claim 1 wherein the pressure responsive means comprises a pressure sensitive valve including a housing, a diaphragm extending across and secured within said housing to form a first and second chamber therein, means forming a third chamber in said housing, a valve orifice in said housing between the second and third chambers, a valve member engaging and movable with the diaphragm to vary the valve orifice and resilient valve biasing means operable between the housing and diaphragm, means connecting the second chamber between the fuel metering control and high pressure pump and means connecting the output side of the high pressure pump to the third chamber.

3. Structure as set forth in claim 2 wherein the valve biasing means is a spring positioned within the second chamber and urging the valve member in a direction to close the valve orifice between the second and third chambers and further including a booster pump connected between the source of fuel and the low pressure pump.

4. Structure as set forth in claim 1 wherein the pressure sensitive means comprises a valve including a housing, a diaphragm secured within said housing forming a first and second chamber therewith, first bias means within the first of said chambers biasing the diaphragm toward the second of said chambers, means forming third, fourth and fifth chambers within said housing, a passage between the second and third chambers, a valve member engageable with said diaphragm and urged toward the third chamber slidably positioned within said passage, a valve orifice between the third and fourth chambers, a passage between the fourth and fifth chambers, a pusher slidably positioned within the passage between the fourth and fifth chambers extending through the valve orifice and engaging said valve member and second biasing means within the fifth chamber biasing the pusher into engagement with the valve member, means connecting the first, third and fifth chambers between the fuel control package and the high pressure pump, means connecting the output of the high pressure pump to the fourth chamber and means connecting the second chamber between the fuel source and fuel control package.

5. Structure as set forth in claim 2 wherein the valve biasing means is a spring positioned within the first chamber and urging the valve member in a direction to open the valve orifice between the second and third chambers.

6. Structure as set forth in claim 2 and further including means connecting the first chamber between the source of fuel and the low pressure pump.

7. Structure as set forth in claim 2 wherein the valve biasing means is a spring positioned within the second chamber and urging the valve member in a direction to close the valve orifice between the second and third chambers.

References Cited by the Examiner
UNITED STATES PATENTS

| | | | |
|---|---|---|---|
| 1,768,904 | 7/1930 | Harris | 137—505.43 |
| 2,292,574 | 8/1942 | Laub | 137—505.43 |
| 2,595,618 | 5/1952 | Vogt et al. | |
| 2,633,187 | 3/1953 | Smith | 158—36.3 |
| 2,679,206 | 5/1954 | Huber | 103—5 |
| 2,683,418 | 7/1954 | Smith. | |
| 2,730,167 | 1/1956 | Sarto | 158—36.4 |
| 2,740,469 | 4/1956 | Colestock | 158—36.4 |
| 2,756,810 | 7/1956 | Simmons | 158—36.4 |
| 3,003,520 | 10/1961 | Corey | 137—505.43 |
| 3,043,367 | 7/1962 | Abraham | 158—36.4 |
| 3,056,259 | 10/1962 | Jubb et al. | 158—36.4 |

FREDERICK L. MATTESON, Jr., *Primary Examiner.*

FREDERICK KETTERER, JAMES W. WESTHAVER, PERCY L. PATRICK, *Examiners.*